(12) United States Patent
Hyodo et al.

(10) Patent No.: US 7,034,881 B1
(45) Date of Patent: Apr. 25, 2006

(54) CAMERA PROVIDED WITH TOUCHSCREEN

(75) Inventors: Manabu Hyodo, Asaka (JP); Makoto Tsugita, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/182,875

(22) Filed: Oct. 30, 1998

(30) Foreign Application Priority Data

Oct. 31, 1997 (JP) .................................. 9-300809

(51) Int. Cl.
*H04N 5/222* (2006.01)
(52) U.S. Cl. .............................. 348/333.12; 348/231.6; 348/333.02; 348/362
(58) Field of Classification Search ............. 348/207.2, 348/224.1, 231.7, 240.2, 373, 375, 240.1, 348/223.1, 229.1, 231.99, 231.3, 231.6, 333.01, 348/333.02, 333.03, 333.11, 333.12, 353, 348/349, 239, 222.1; 382/282
See application file for complete search history.

(56) References Cited

U.S. PATENT DOCUMENTS

| | | | | |
|---|---|---|---|---|
| 4,189,744 A | * | 2/1980 | Stern ........................... 348/577 |
| 4,769,695 A | * | 9/1988 | Terashita ...................... 358/527 |
| 4,816,874 A | * | 3/1989 | Terashita et al. ............... 355/38 |
| 5,028,950 A | * | 7/1991 | Fritsch ........................ 355/22 |
| 5,063,407 A | * | 11/1991 | Takagi .......................... 355/77 |
| 5,172,234 A | * | 12/1992 | Arita et al. ............... 348/240.2 |
| 5,319,416 A | * | 6/1994 | Takagi ......................... 396/100 |
| 5,369,463 A | * | 11/1994 | Terashita et al. ............... 355/38 |
| 5,412,487 A | * | 5/1995 | Nishimura et al. .......... 348/346 |
| 5,471,535 A | * | 11/1995 | Ikezawa et al. ............. 382/199 |
| 5,477,264 A | * | 12/1995 | Sarbadhikari et al. ... 348/231.6 |
| 5,625,415 A | * | 4/1997 | Ueno et al. ................. 348/346 |
| 5,706,049 A | * | 1/1998 | Moghadam et al. ...... 348/231.3 |
| 5,808,678 A | * | 9/1998 | Sakaegi .................. 348/333.03 |
| 5,838,370 A | * | 11/1998 | Kaji ........................ 348/240.2 |
| 5,838,371 A | * | 11/1998 | Hirose et al. ............. 348/240.2 |
| 5,881,170 A | * | 3/1999 | Araki et al. ................. 382/199 |
| 6,011,547 A | * | 1/2000 | Shiota et al. ............... 382/254 |
| 6,040,825 A | * | 3/2000 | Yamamoto et al. ......... 345/173 |
| 6,067,114 A | * | 5/2000 | Omata et al. ............... 348/347 |
| 6,111,605 A | * | 8/2000 | Suzuki .................. 348/231.99 |
| 6,222,646 B1 | * | 4/2001 | Maurinus et al. ........... 358/440 |
| 6,300,955 B1 | * | 10/2001 | Zamir ........................ 382/283 |
| 6,317,156 B1 | * | 11/2001 | Nagasaki et al. ........... 348/373 |
| 6,710,802 B1 | * | 3/2004 | Akahori et al. .......... 348/229.1 |
| 6,919,927 B1 | * | 7/2005 | Hyodo .................. 348/333.02 |

FOREIGN PATENT DOCUMENTS

JP 3-105336 5/1991

(Continued)

*Primary Examiner*—Tuan Ho
*Assistant Examiner*—Jason Whipkey

(57) ABSTRACT

An electronic camera is provided with a touchscreen. When a cameraman touches the touchscreen on a principal subject in a captured image shown on the touchscreen, the touched portion is determined and the focus and exposure are adjusted in conformity with the principal subject. When the image is designated to be stored, positional information on the principal subject as well as image information is stored into a built-in memory or a detachable external memory. For this reason, wherever the principal subject is located on the image, the image-capturing is performed with favorable results. The positional information on the principal subject is utilized for printing or reproducing the image so as to perform image tone corrections such as correction of brightness and skin pigmentation in an area including the principal subject, so that a high-quality image can be printed or reproduced.

36 Claims, 16 Drawing Sheets

FOREIGN PATENT DOCUMENTS

| | | |
|---|---|---|
| JP | 4-285933 | 10/1992 |
| JP | 6-70206 | 3/1994 |
| JP | 7 28390 | 3/1995 |
| JP | 07095136 * | 10/1995 |
| JP | 8-22343 | 1/1996 |
| JP | 8-32855 | 2/1996 |
| JP | 8-122847 | 5/1996 |
| JP | 9 116792 A | 5/1997 |
| JP | 09116792 * | 5/1997 |
| JP | 2 743551 | 2/1998 |

* cited by examiner

F I G. 1
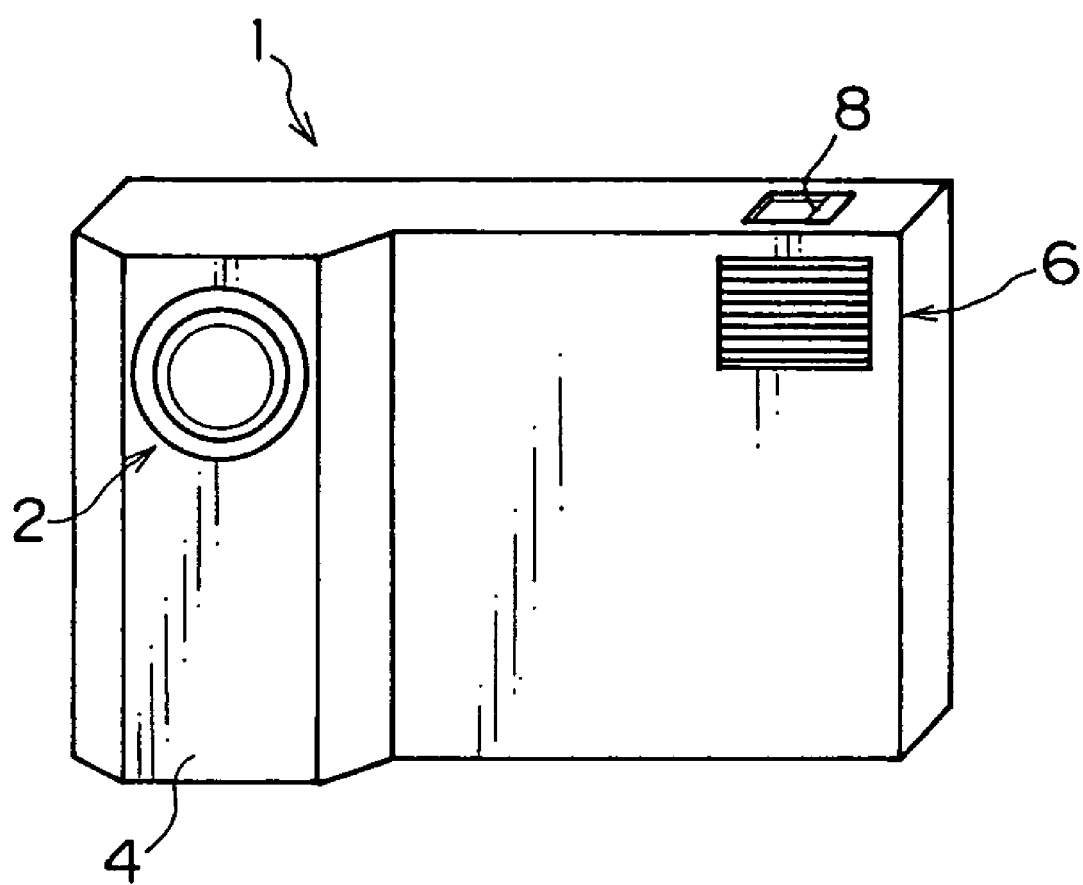

F I G. 2
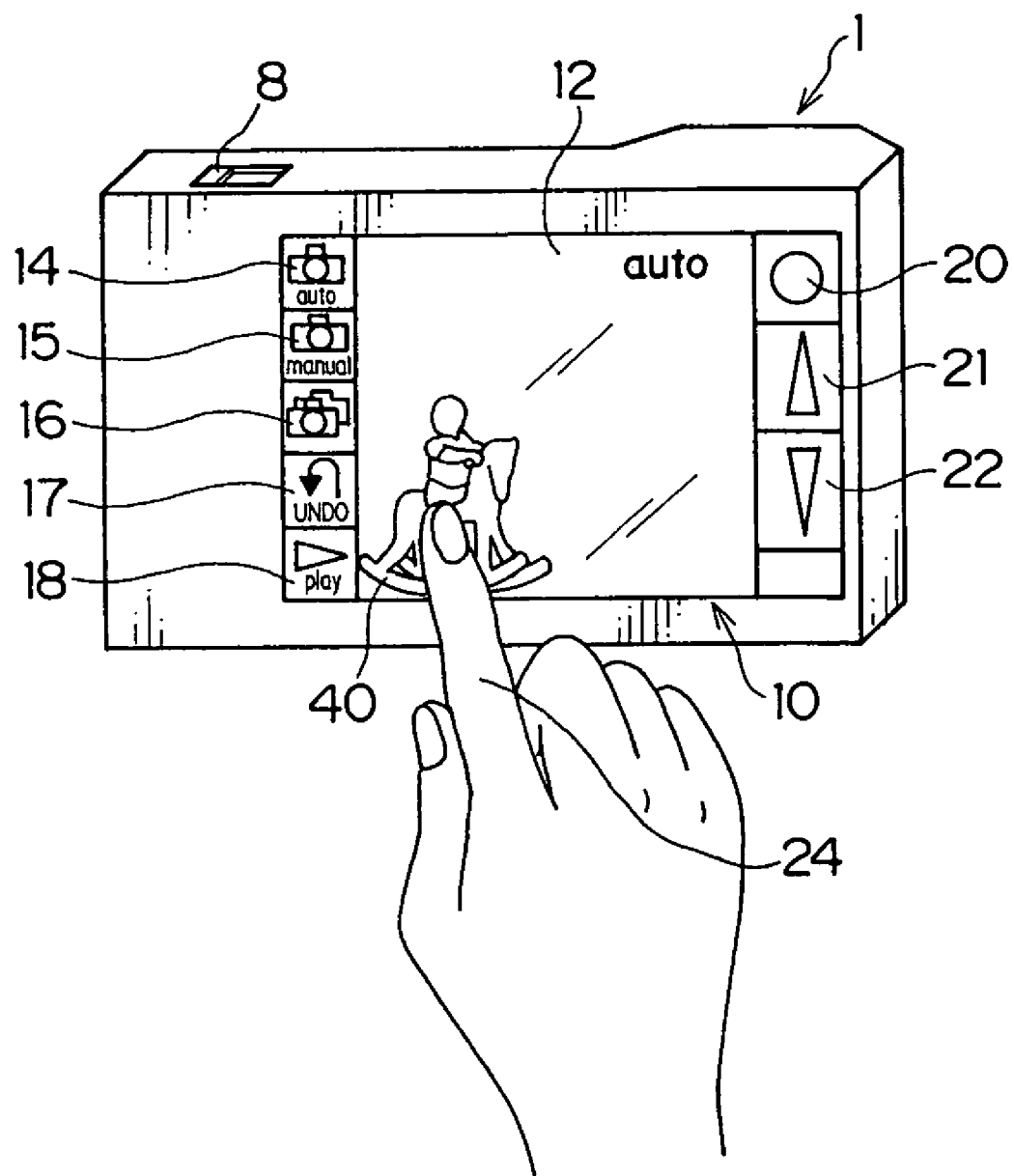

F I G. 1 2
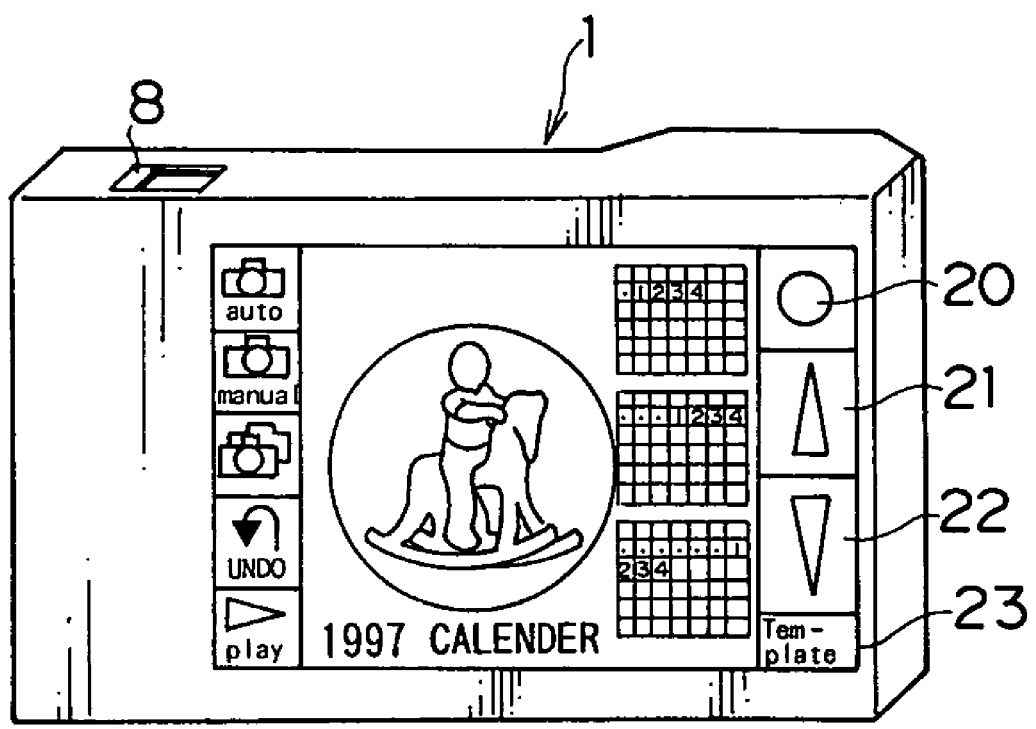

F I G. 14
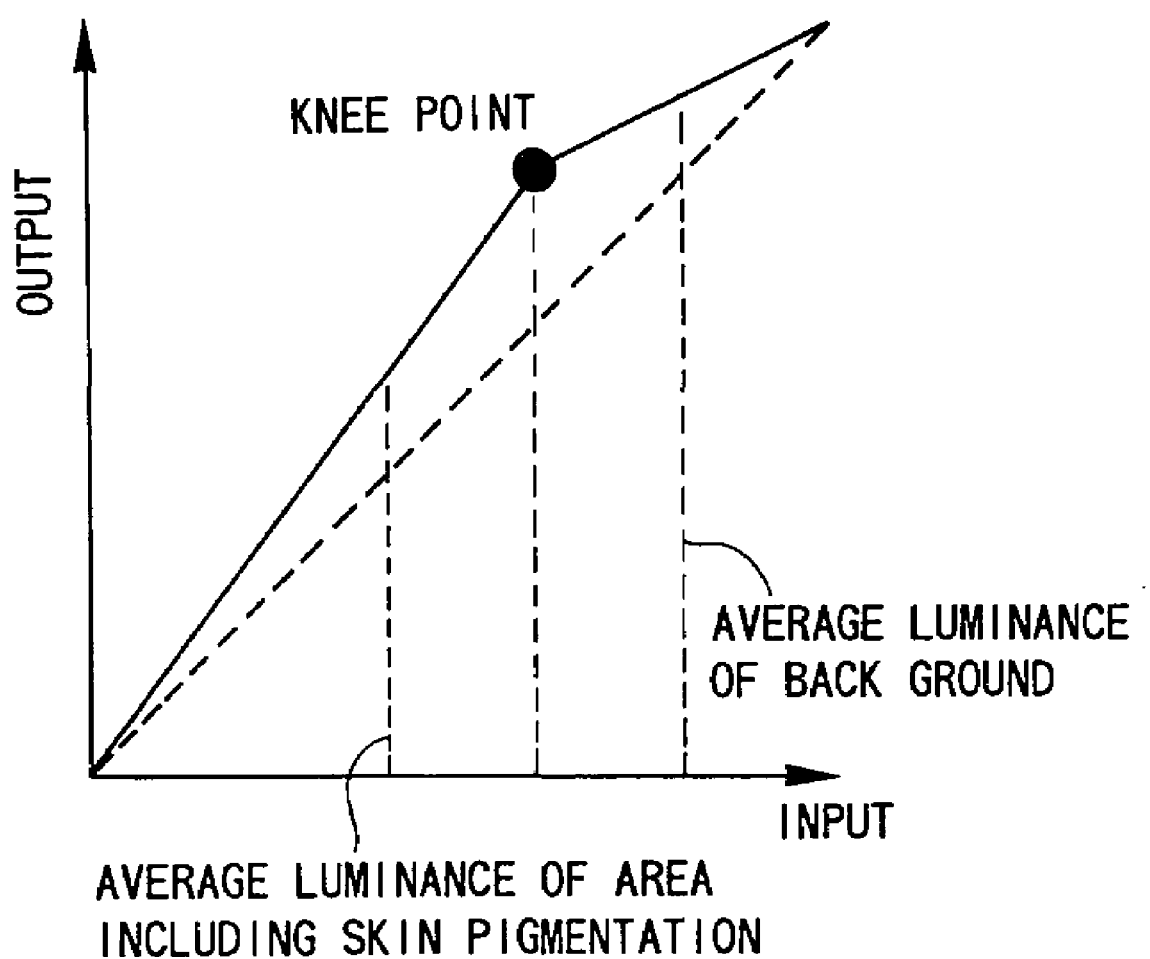

CAMERA PROVIDED WITH TOUCHSCREEN

BACKGROUND OF THE INVENTION

1. Field of the Invention

The present invention relates generally to a camera provided with a touchscreen, and more particularly to an electronic camera that takes a variety of actions in accordance with instructions input through a touchscreen.

2. Description of Related Art

A conventional electronic camera for recording still images has a control part such as a shutter release and a zoom lever on a camera body. The camera works in response to instructions input through the control part. The conventional electronic camera also has a display part, such as a liquid crystal display (LCD), showing captured images at the back of the camera. Thus, the conventional electronic camera is provided with the control part and the display part separately.

In the field of video cameras, Japanese Patent Provisional Publication No. 9-116792 proposes a video camera having a touchscreen that displays images captured by the video camera and shows icons over the images so that a cameraman operates the video camera by touching the touchscreen on the icons with a finger.

Other cameras are proposed that enable an auto-focus (AF) area and an auto-exposure (AE) area to be designated with a touchscreen (Japanese Patent No. 2,743,551, Japanese Patent Publication No. 7-28390 and Japanese Patent Publication No. 7-95136).

If, however, the electronic camera is provided with the touchscreen, there is a problem peculiar to the electronic camera. Specifically, the electronic camera that records still images must not only focus and adjust photometry to record the image satisfactorily but also reproduce the high-quality image when the recorded image is reproduced or printed.

In particular, if a cameraman puts emphasis on a certain subject (hereinafter referred as a principal subject) such as a person, the principal subject must be reproduced as a high-quality image. With the use of a printing or reproducing apparatus in a photofinishing laboratory, etc., it is difficult to determine which is the principal subject in the recorded image, and it is impossible to automatically print or reproduce the image while regarding the principal subject as the most important.

SUMMARY OF THE INVENTION

The present invention has been developed in view of the above-described circumstances, and has as its object the provision of a camera provided with a touchscreen that works simply in response to the touch on the touchscreen and enables to record, reproduce and print an image while regarding a principal subject designated by a cameraman as the most important.

To achieve the above-mentioned object, the present invention is directed to a camera for recording a captured image on a recording medium in accordance with an instruction from a recording instruction device, the camera comprising: an imaging part provided with an imaging optical system and an imaging device; a display part for showing an image captured by the imaging part; a touch panel provided over the display part; a positional information acquiring device for determining a touched portion of the touch panel; a principal subject determining device for determining a principal subject in the captured image shown on the display part in accordance with the determined touched portion; and a principal subject position recorder for recording, on the recording medium, principal subject positional information representing the position of the determined principal subject in the captured image when the captured image is recorded on the recording medium in accordance with the instruction from the recording instruction device.

According to the present invention, the image captured by the imaging part is displayed on the screen of the display part. When the cameraman looks at the image on the display part and touches the principal subject with a finger or a pen, the touched portion is determined with the touch panel and the positional information acquiring device. The camera determines the principal subject on the screen in accordance with the pressed portion. When the captured image is recorded on the recording medium, the principal subject positional information representing the position of the principal subject in the image as well as the image information is recorded on the recording medium.

The camera further comprises an exposure controller for controlling exposure in conformity with the determined principal subject, and an auto-focus device for focusing the imaging optical system on the determined principal subject. The camera can control the AE device for the image while regarding the principal subject as the most important, and focus by controlling the AF device so that the imaging optical system focuses on the principal subject.

The recording medium is, for example, a memory, which records a variety of information such as image data electrically or magnetically, or a photographic film coated with a magnetic layer. Since the positional information about the principal subject as well as the image is recorded on the recording medium, the positional information can be utilized for printing or reproducing so that a high-quality image can be printed or reproduced.

A release button may be provided at the body of the camera, but a recording instruction device is preferably composed of the touch panel and the positional information acquiring device in such a way as to direct that the image be recorded on the recording medium in response to the touching of the touch panel. This eliminates the necessity for providing a control member such as the release button and reduces the size of the camera. Moreover, it is advantageous that the designation of the principal subject and the ordering of the image recording are performed at the same time.

The principal subject may be designated not only by designating a point of the principal subject (a point designation) but also by enclosing the principal subject with a closed figure such as a circle (an area designation) etc. Accordingly, the camera further comprises: a frame detector for detecting, with the positional information acquiring device, a closed figure from a track of the touched portion described on the touch panel; and a frame display processor for displaying the closed figure on the display part; wherein the principal subject determining device determines, as the principal subject, an area inside the closed figure on the captured image.

According to the above structure, the image is displayed together with an arbitrarily-described frame enclosing the principal subject, and the area within the closed figure is regarded as the principal subject.

According to the present invention, an electronic camera comprises: an imaging part provided with an imaging optical system and an imaging device; a recording instruction device; a recording part for recording, in a memory, an image captured by the imaging part in accordance with an instruction from the recording instruction device; a display part for showing an image captured by the imaging part; a touch panel provided over the display part; a positional information acquiring device for determining a touched portion of the touch panel; a principal subject determining device for determining a principal subject in the captured image shown on the display part in accordance with the determined touched portion; and a principal subject position recorder for recording, on the recording medium, principal subject positional information representing the position of the determined principal subject in the captured image as well as image data representing the captured image when the captured image is recorded on the recording medium in accordance with the instruction from the recording instruction device.

The electronic camera is capable of retrieving the image recorded in the memory and reproducing it on the display part. Since there is provided the image tone correcting device that performs a predetermined image correction such as correction of the brightness and skin pigmentation for the principal subject, the high-quality image can reproduced.

The electronic camera further comprises an exposure controller for controlling exposure in conformity with the determined principal subject, and an auto-focus device for focusing the imaging optical system on the determined principal subject.

There is also provided an image processor for expanding and reducing the captured image about a reference point determined in accordance with the principal subject positional information, and thus the image can be expanded or reduced freely in accordance with the principal subject.

According to another embodiment, the electronic camera further comprises: a template image storage part for containing a template image to be composed with the captured image; and an image composition processor for composing the template image retrieved from the template image storage part and the area inside the frame indicated with the closed figure on the captured image. Then, an area (the principal subject) that is composed into the template image can be designated easily, and a desired composed image is obtained. The composed image can be stored in the memory.

According to the present invention, a printing apparatus for printing the image recorded on the recording medium by the camera of the present invention, the printing apparatus comprises at least one of: an image tone correcting device for performing a predetermined image tone correction for the principal subject during reproduction of the recorded image in accordance with the recorded principal subject positional information; and an image processor for expanding and reducing the image about a reference point determined in accordance with the principal subject positional information.

According to the present invention, the principal subject positional information recorded on the recording medium is utilized to print the high-quality image and expand/reduce the image while regarding the principal subject as the most important.

According to the present invention, an image reproducing apparatus for reproducing, on a display, the image recorded on the recording medium by the camera of the present invention, the printing apparatus comprises at least one of: an image tone correcting device for performing a predetermined image tone correction for the principal subject during reproduction of the recorded image in accordance with the recorded principal subject positional information; and an image processor for expanding and reducing the image about a reference point determined in accordance with the principal subject positional information.

According to the present invention, the principal subject positional information recorded on the recording medium is utilized to reproduce the high-quality image and expand/reduce the image while regarding the principal subject as the most important.

According to the present invention, a camera for recording a captured image on a recording medium in accordance with an instruction from a recording instruction device, the camera comprises: an imaging part provided with an imaging optical system and an imaging device; a display part for showing an image captured by the imaging part; a pointing device for controlling a pointer on the display part; a positional information acquiring device for determining a portion of the display part pointed with the pointer; a principal subject determining device for determining a principal subject in the captured image shown on the display part in accordance with the determined pointed portion; and a principal subject position recorder for recording, on the recording medium, principal subject positional information representing the position of the determined principal subject in the captured image when the captured image is recorded on the recording medium in accordance with the instruction from the recording instruction device.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a front view of an electronic camera according to an embodiment of the present invention;

FIG. 2 is a back view of the electronic camera in FIG. 1;

FIG. 12 is a view illustrating a state wherein a captured image and a template image are composed;

FIG. 14 is a graph showing an input-output relationship in a knee processing;

DETAILED DESCRIPTION OF THE PREFERRED EMBODIMENT

Figure 3:
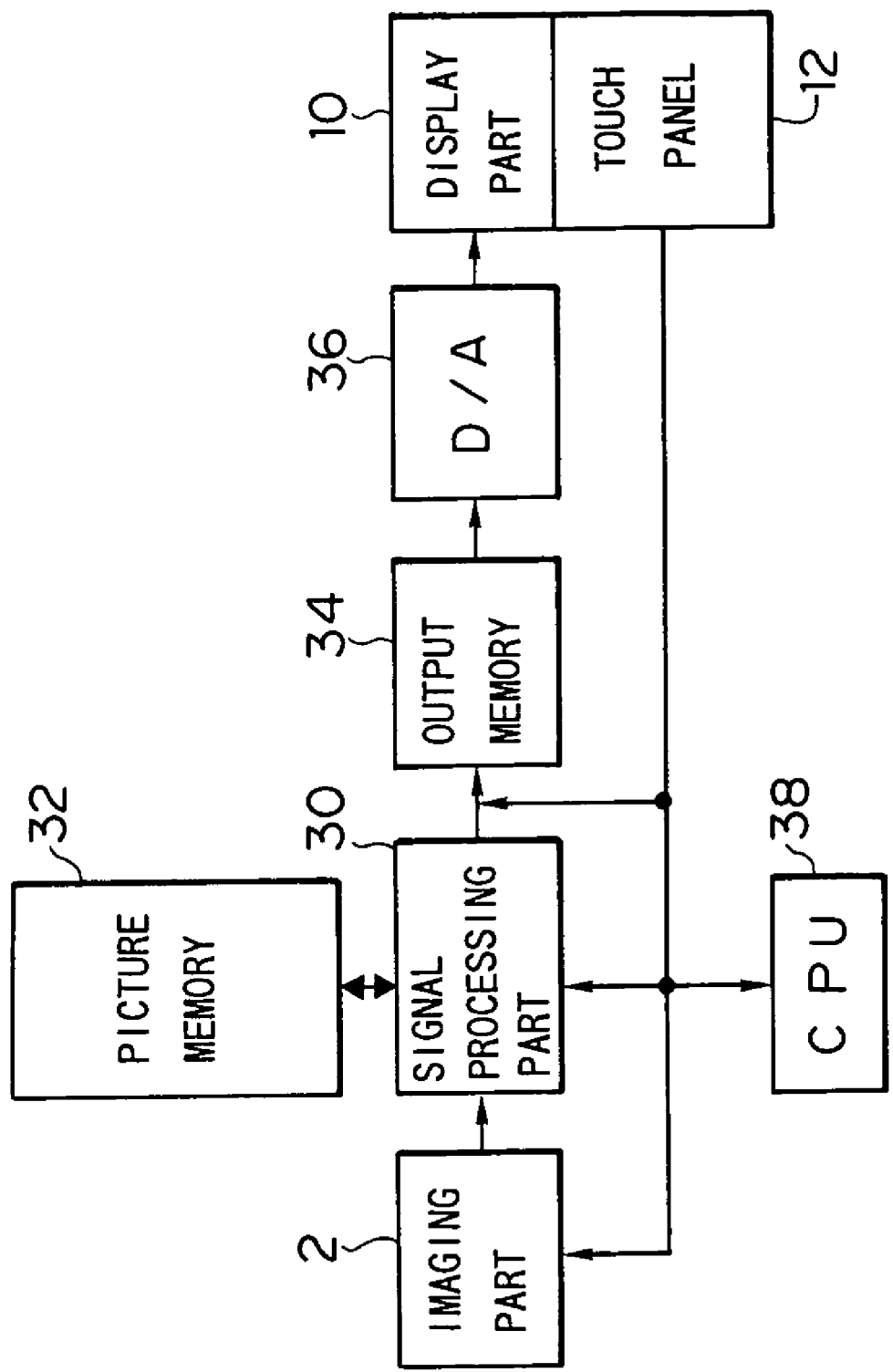
FIG. 3 is a block diagram illustrating the inner structure of the electronic camera.

This invention will be described in further detail by way of example with reference to the accompanying drawings.

FIG. 1 is a front view illustrating an electronic camera 1 of an embodiment according to the present invention. As shown in FIG. 1, an imaging part 2 is provided at the upper left corner at the front of the electronic camera 1, and a grip 4, with which a cameraman can easily hold the camera 1, is formed at the left part of the front face of the camera 1 including the imaging part 2. The imaging part 2 has an imaging optical system or a taking lens, and an imaging device or a CCD (not illustrated) is arranged behind the taking lens. Although not illustrated, the taking lens is a rear focus type zoom lens for example, which is composed of a variable magnification lens group and a correction lens group. A flash lamp 6 is arranged at the upper right corner of the front face of the camera 1, and a power switch 8 is provided at the top of the camera 1.

FIG. 2 shows the electronic camera 1 of FIG. 1 seen from the back. An image display part 10 is provided at the back of the camera 1. The display part 10 is an LCD for example, and a touch panel 12 with light permeability is provided over the display part 10.

A variety of buttons are provided at the right and left edges of the display part 10. An auto-mode button 14, a manual mode button 15, a blur-prevention mode button 16, an undo button 17 and a play button 18 are arranged at the left edge, and a release (execution) button 20, an up button 21 and a down button 22 are arranged at the right edge. The cameraman presses or touches these buttons with a finger 24 or a pen to perform a desired operation.

FIG. 3 is a block diagram illustrating the inner structure of the electronic camera 1. The electronic camera 1 comprises the imaging part 2, a signal processing part 30, an image memory 32, an output memory 34, a D/A converter 36, the display part 10, the touch panel 12, and a central processing unit (CPU) 38.

An object image formed on a light receiving surface of the CCD through the taking lens of the imaging part 2 is photoelectrically converted and read out as a video signal sequentially. Although not illustrated in detail, the signal processing part 30 comprises an analog processing circuit including a CDS cramp circuit and a gain adjustment circuit, an A/D converter, and a digital image processing circuit including a luminance signal generating circuit, a color difference signal generating circuit and a gamma correction circuit. The video signal read from the imaging part 2 is processed appropriately at the signal processing part 30, and it is recorded in a recording part such as the image memory 32, which is a built-in flash memory or a detachable external memory card, for example.

The video signal read from the imaging part 2 or the image memory 32 is processed at the signal processing part 30, and it is sent to the output memory 34. The video signal is sent to the display part 10 through the D/A converter 36, and a captured image is shown on the display part 10. The display part 10 can show not only still images that are stored when the release button 20 is touched but also images (moving images or intermittent images) captured before the release button 20 is touched.

The CPU 38 comprehensively controls the circuits in the camera 1, and determines the touched portion of the touch panel 12 in accordance with signals sent from the touch panel 12. The CPU 38 also controls the imaging part 2 for zooming, focusing, etc.; the display on the display part 10; and the write/read of the image data into/from the image memory 32.

Figure 4:
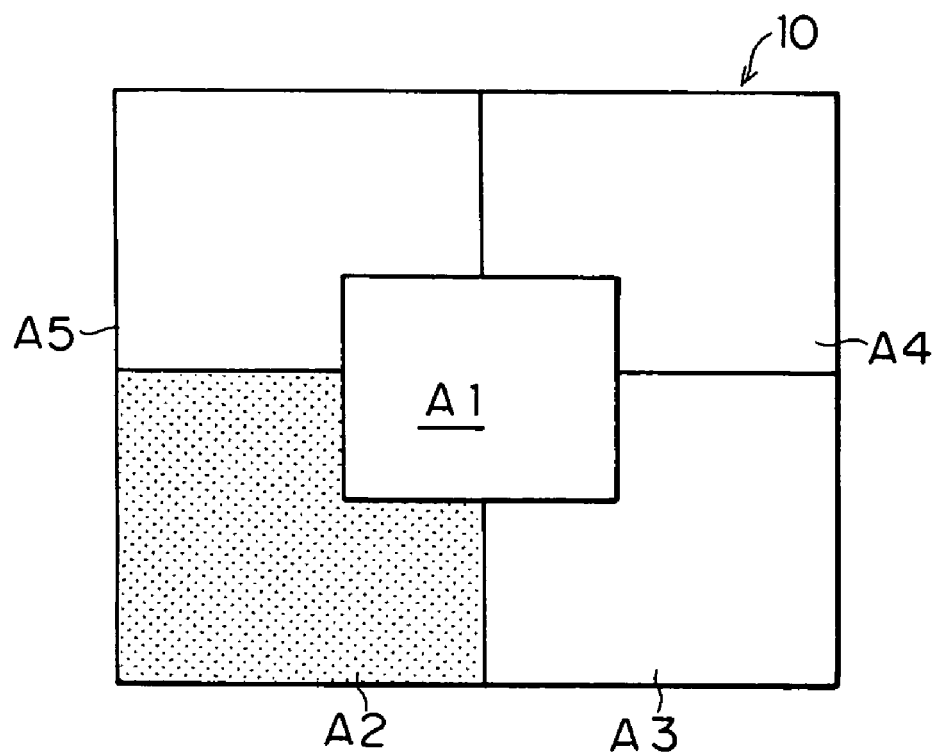
FIG. 4 is a view conceptionally describing one example wherein a display part in FIG. 2 is split.

The screen of the display part 10, which shows the captured images, is split into five areas A1, A2, A3, A4 & A5 as shown in FIG. 4. The screen may not necessarily be split particularly in the manner described in FIG. 4. When the screen is touched by the cameraman, the touched portion is determined, and the split area that includes the touched portion (hereinafter referred to as a touched area) is determined. A photometry value is measured with respect to the touched area, and an exposure value is determined according to the photometry value. When a subject 40 at the lower left of the screen of the display part 10 (see FIG. 2) is touched by the cameraman to be designated as a principal subject, a photometry value is measured with respect to the touched area A2, which is located at the lower left of the screen in FIG. 4.

Figure 5:
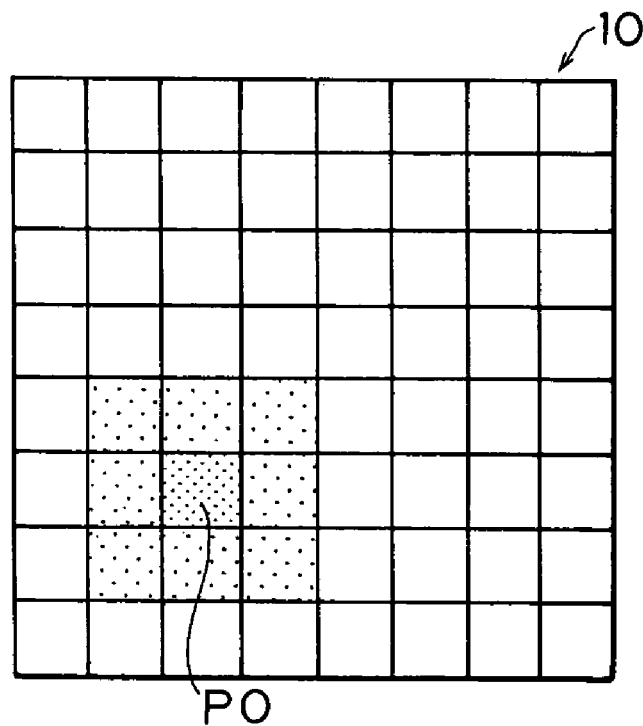
FIG. 5 is a view conceptionally describing another example wherein the display part in FIG. 2 is split.

The screen of the display part 10 may be split fine as shown in FIG. 5, and the photometry value and the exposure value may be determined as follows: the photometry value is measured with respect to a touched area P0 and areas surrounding the touched area P0 (eight split areas adjacent to the touched area P0 in FIG. 5); and the exposure value is determined with respect to these areas. In FIG. 5, the screen of the display part 10 is split into 8×8 areas, but it may also be split in any other way.

In addition, the principal subject may be determined in accordance with the determination of the touched portion. Then, the photometry value for the entire screen is calculated to determine the exposure value, while the measured photometry value for the area including the principal subject is weighted whereas measured photometry values for the other areas are lightened.

A description will be given of the operation of the electronic camera 1, which is constructed in the above-mentioned manner.

The electronic camera 1 has a first auto mode (an auto mode A) and a second auto mode (an auto mode B), and the two modes are switched alternately every time the auto-mode button 14 in FIG. 2 is touched.

Figure 6:
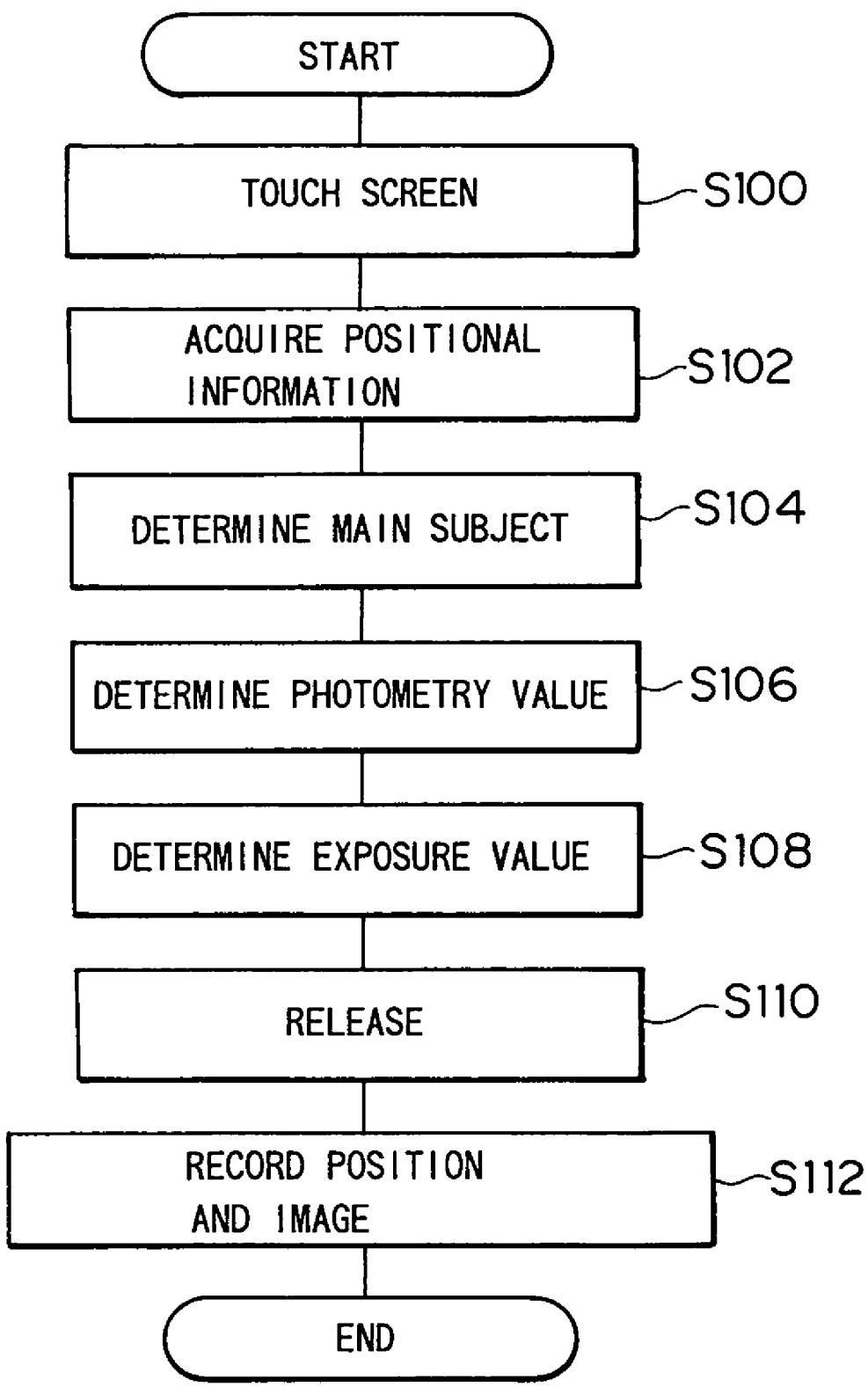
FIG. 6 is a flow chart showing a procedure in a first auto mode of the electronic camera.
Figure 7:
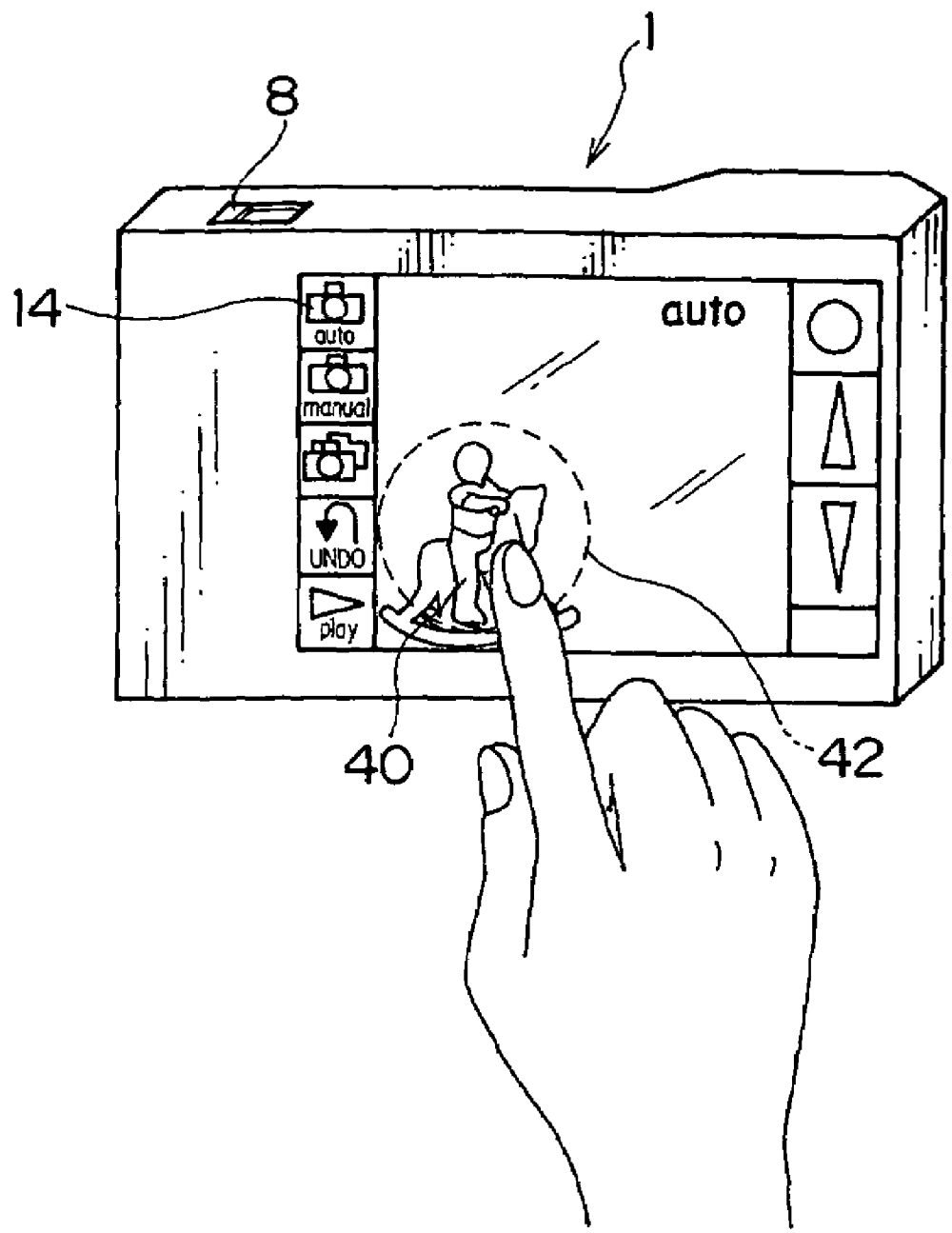
FIG. 7 is a view illustrating a state wherein a principal subject is designated.

FIG. 6 is a flow chart showing a procedure in the auto mode A. In the auto mode A, when the cameraman once touches the screen of the display part 10, a captured image is stored in the image memory 32. Specifically, when the cameraman touches the principal subject 40 on the screen (S100), the CPU 38 gets the positional information about the touched portion in accordance with an input signal from the touch panel 12 (S102). At this time, a circle 42 of a predetermined size (a principal subject selection frame) is displayed around the determined touched portion as shown in FIG. 7 so as to indicate the touched area. In FIG. 7, the circle 42 is indicated with a broken line, but it may also be indicated with a solid line. Another figure such as an ellipse and a quadrilateral may also be shown. Preferably, the figure indicating the touched area is shown in white if the background of the screen is dark, and the figure is shown in black if the background is bright.

Then, the principal subject is determined in accordance with the touched portion determined at S102 in FIG. 6 (S104). For instance, (1) the touched area, which is the split area including the determined touched portion, is regarded as the principal subject; (2) the touched area and the split areas within predetermined limits around the touched area are regarded as the principal subject; (3) information about a luminance (e.g. an average luminance) of the touched area is picked up, and the touched area and the split area or areas around the touched area that has substantially the same luminance with the touched area are regarded as the principal subject; (4) information about a hue (e.g. an average hue) of the touched area is picked up, and the touched area and the split area or areas around the touched area that has substantially the same hue with the touched area are regarded as the principal subject; (5) the luminance information (the average luminance) and the hue information (the average hue) of the touched area are picked up, and the touched area and the split area or areas around the touched area are regarded as the principal subject in view of the luminance and the hue; (6) if skin pigmentation is found in the touched area, the touched area and the split area or areas around the touched area that includes substantially the same color with the touched area are regarded as the principal subject; or (7) the lower right, the lower left, the upper right or the upper left area of the touched area and the touched area are regarded as the principal subject in accordance with the information about the direction of the detected touched portion. The principal subject may be determined in a variety of ways other than the above (1)–(7).

After the principal subject is determined in a predetermined way at S104, a photometry value is measured with respect to the determined principal subject, or the photometry value is calculated by weighting the measured photometry values for the principal subject (S106), and the exposure value is determined according to the photometry value (S108). Thus, the exposure is adjusted automatically in conformity with the principal subject. Then, the principal subject is focused, and the image is designated to be stored (S110).

Then, the designated image and the positional information about the principal subject are stored in the image memory 32 (S112). The positional information may relate to the numbers of pixels (coordinates) from the origin, which is the upper left corner for example, of the screen of the display part 10 or the distances calculated from the numbers of pixels. The origin may be located at another corner of the screen or the center of the screen. Instead of the numbers of pixels, the positional information may be determined in accordance with the geometric distances on the touch panel 12.

As stated above, in the auto mode A, the captured image is stored in the image memory 32 when the cameraman touches the screen of the display part 10 only once, and therefore, the cameraman can store a desired image without losing a good opportunity for shooting.

Figure 8:
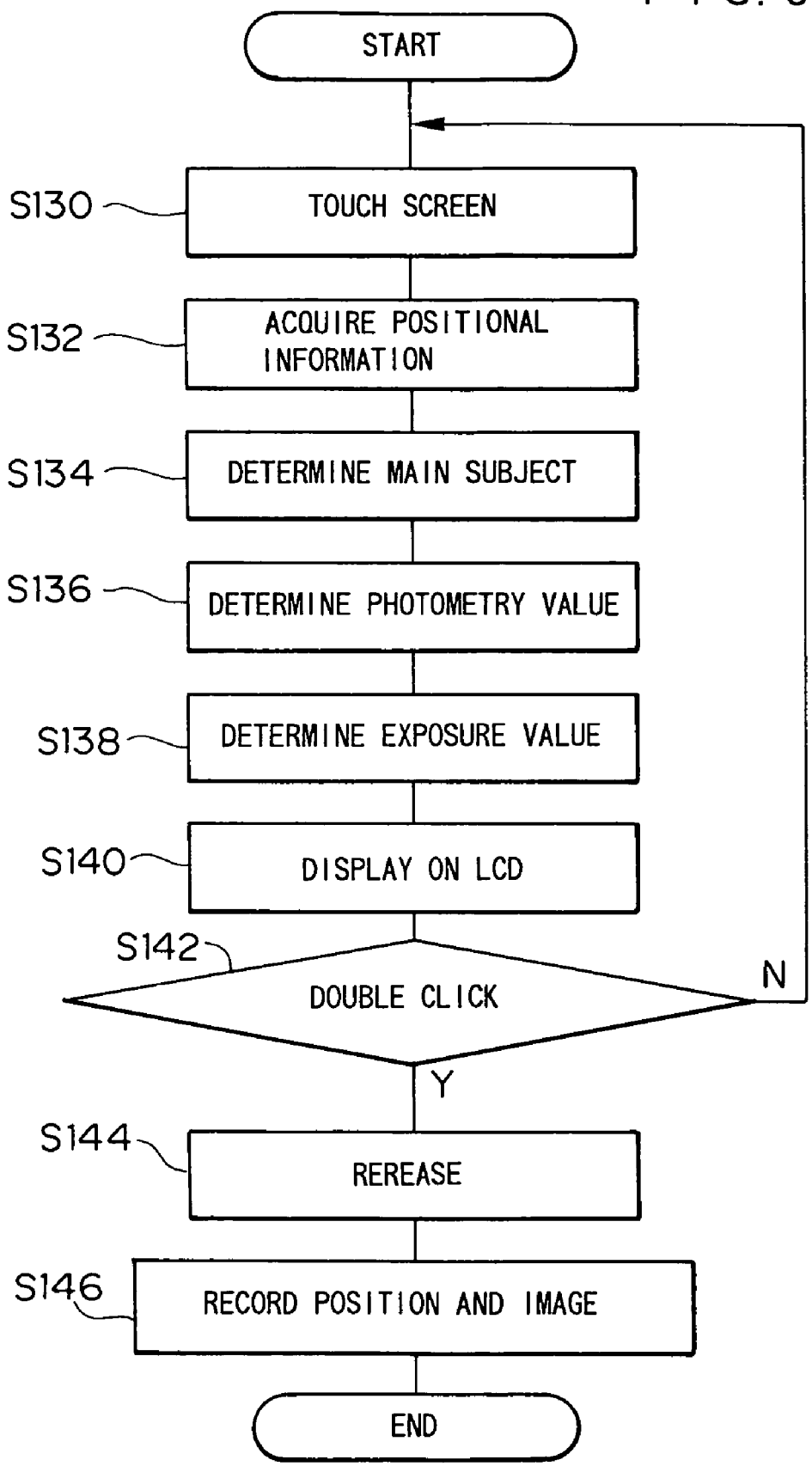
FIG. 8 is a flow chart showing a procedure in a second auto mode of the electronic camera.

FIG. 8 is a flow chart showing a procedure in the auto mode B. In the auto mode B, after the determination of the principal subject, the cameraman confirms the image prior to storing, and instructs again whether to store the image or not. Specifically, once the cameraman touches the screen of the display part 10 (S130), the positional information about the touched portion is picked up (S132). As has been described with reference to FIG. 7, the circle 42 of the predetermined size is displayed around the determined touched portion of the screen, so that the cameraman can easily confirm the touched portion.

Then, the principal subject is determined in accordance with the touched portion determined at S132 as is the case with the auto mode A (S134). A photometry value is measured with respect to the determined principal subject, or the photometry value is calculated by weighting the measured photometry values for the principal subject (S136), and the exposure value is determined in accordance with the photometry value (S138). Thus, the exposure is adjusted automatically in conformity with the principal subject. Then, the principal subject is focused, and the image including the principal subject is shown on the display part 10 (S140).

Figure 9:
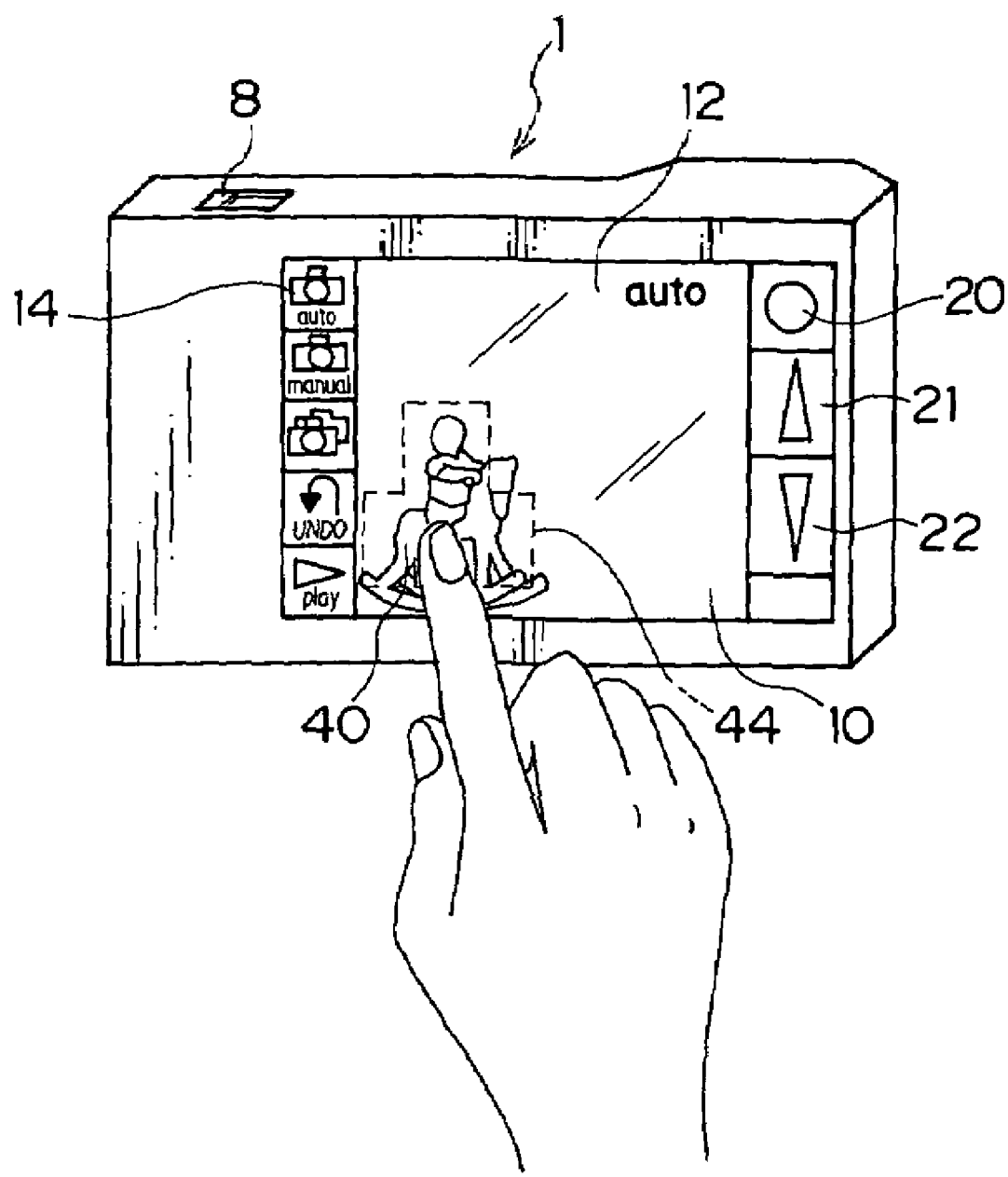
FIG. 9 is a view illustrating a state wherein a determined principal subject is displayed.

At this time, as shown in FIG. 9, a frame 44 indicating the area of the principal subject determined at S134 is displayed on the display part 10. Instead of the frame 44, a certain figure such as a circle may also be displayed in such a way as to enclose the principal subject. In FIG. 9, the frame 44 is indicated with a broken line, but it may also be indicated with a solid line. Preferably, the frame 44 is shown in white if the background of the screen is dark, and the frame 44 is shown in black if the background is bright. As a result, the cameraman can confirm the area of the principal subject.

After the image on the display part 10 is confirmed at S140 in FIG. 8, the release button 20 is touched or the screen is touched twice in rapid succession (double-clicked) so as to direct that the image be stored (S142). If there is no instruction such as the double-click in a preset time, the procedure returns to S130. If there is the instruction in the preset time, the image is designated to be stored (S144). Then, the designated image and the positional information about the principal subject are stored in the image memory 32 (S146). The stored positional information represents the position of the principal subject, which was determined previously by touching the screen once.

As stated above, in the auto mode B, the image to be stored is displayed prior to the storage into the image memory, and the approval for storing the image is required again. It is therefore possible to prevent an image that is not desired by the cameraman from being stored.

Figure 10:
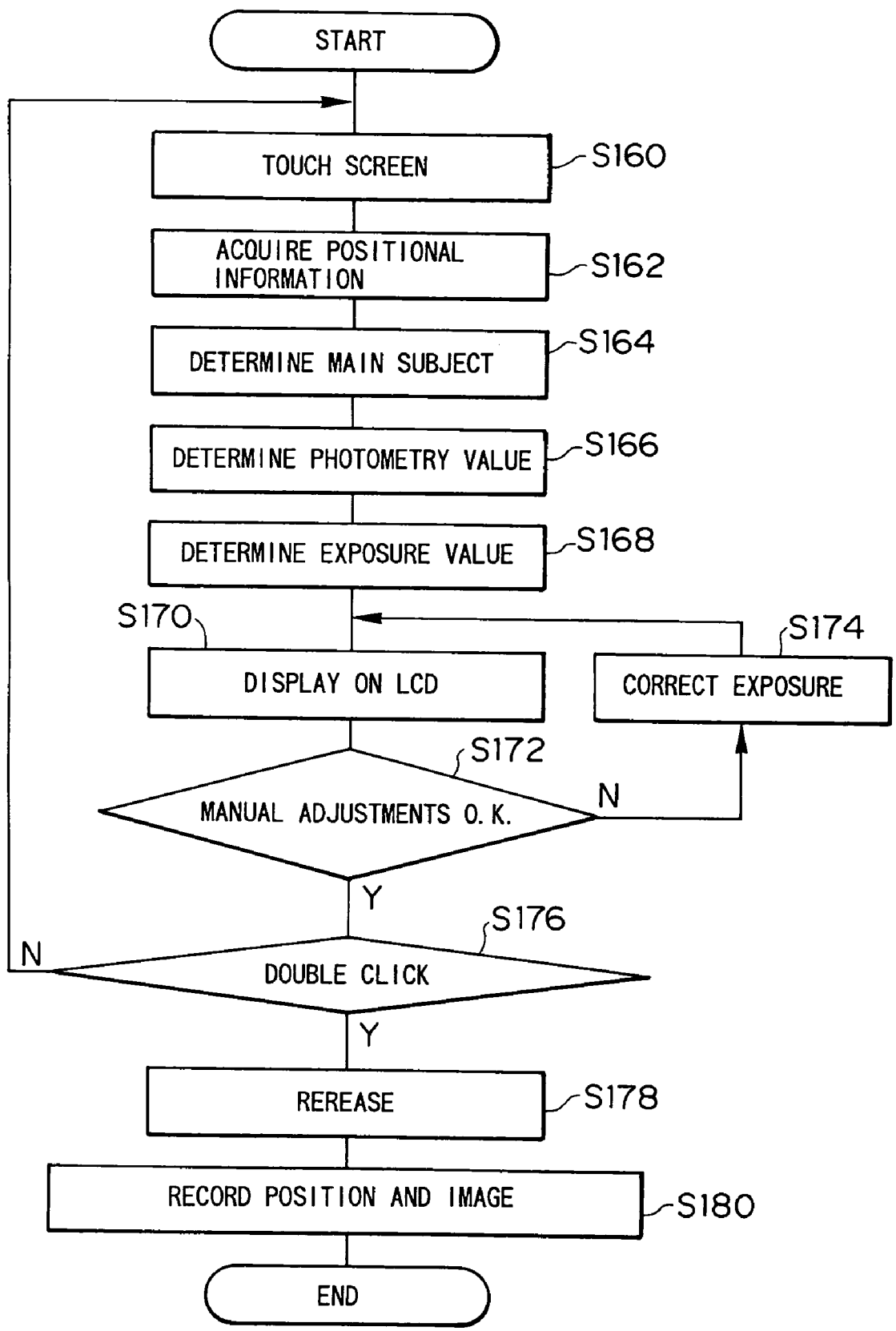
FIG. 10 is a flow chart showing a procedure in a manual mode of the electronic camera.

FIG. 10 is a flow chart showing a procedure in a manual mode. In the manual mode, the cameraman can arbitrarily correct the exposure and focusing of the camera that are adjusted previously by the AE and AF functions of the camera. Once the screen is touched (S160), the touched portion is determined (S162), and the principal subject is determined as is the case with the auto mode B (S164). At the same time, the AE and AF functions work in the state wherein the principal subject is regarded as the most important (S166 & S168), and the image designated to be stored is shown on the display part 10 (S170).

The cameraman touches the up button 21 and the down button 22 with reference to the image shown on the display part 10 so as to adjust the brightness (S172) and correct the exposure value (S174).

On completion of the manual adjustments, the release button 20 is touched or the screen is double-clicked to direct the storing (S176). If there is no instruction such as the double-click in a preset time, the procedure returns to S160. If there is the instruction such as the double click in the preset time, the image is designated to be stored (S178), and the designated image and the positional information of the principal subject are stored in the image memory 32 (S180).

The image stored in the image memory 32 can be reproduced on the display part 10. Specifically, when the play button 18 at the lower left of the screen is touched to set the reproduction mode, the image data of the first frame stored in the image memory 32 is retrieved, and the image is reproduced. Then, the up button 21 and the down button 22 are touched so as to change frame numbers of frames to be reproduced. Every time the frame is reproduced, the image tone is corrected in accordance with the positional information about the principal subject, which is stored with the image in each frame, in the state wherein the principal subject is regarded as the most important.

For instance, (1) the luminance of the principal subject area is adjusted to substantially coincide with a preset luminance level; (2) the hue of the principal subject area is adjusted to substantially coincide with a predetermined hue; (3) if the principal subject area includes the skin pigmentation, the average luminance at that part is adjusted to substantially coincide with a preset luminance; or (4) the size of the principal subject area is found, and whether to perform the above correction processes (1)–(3) is determined in accordance with the size. The image tone may be corrected in a variety of ways other than the above (1)–(4).

Consequently, the use of the positional information about the principal subject reproduces the high-quality image in the state wherein the principal subject is regarded as the most important.

In this embodiment, the cameraman touches a point in the principal subject shown on the screen of the display part 10 with the finger 24 or the pen so as to designate the principal subject, but the cameraman may also designate the principal subject by enclosing the area including the principal subject with as a closed figure such as a circle, an ellipse and a quadrilateral.

Figure 11:
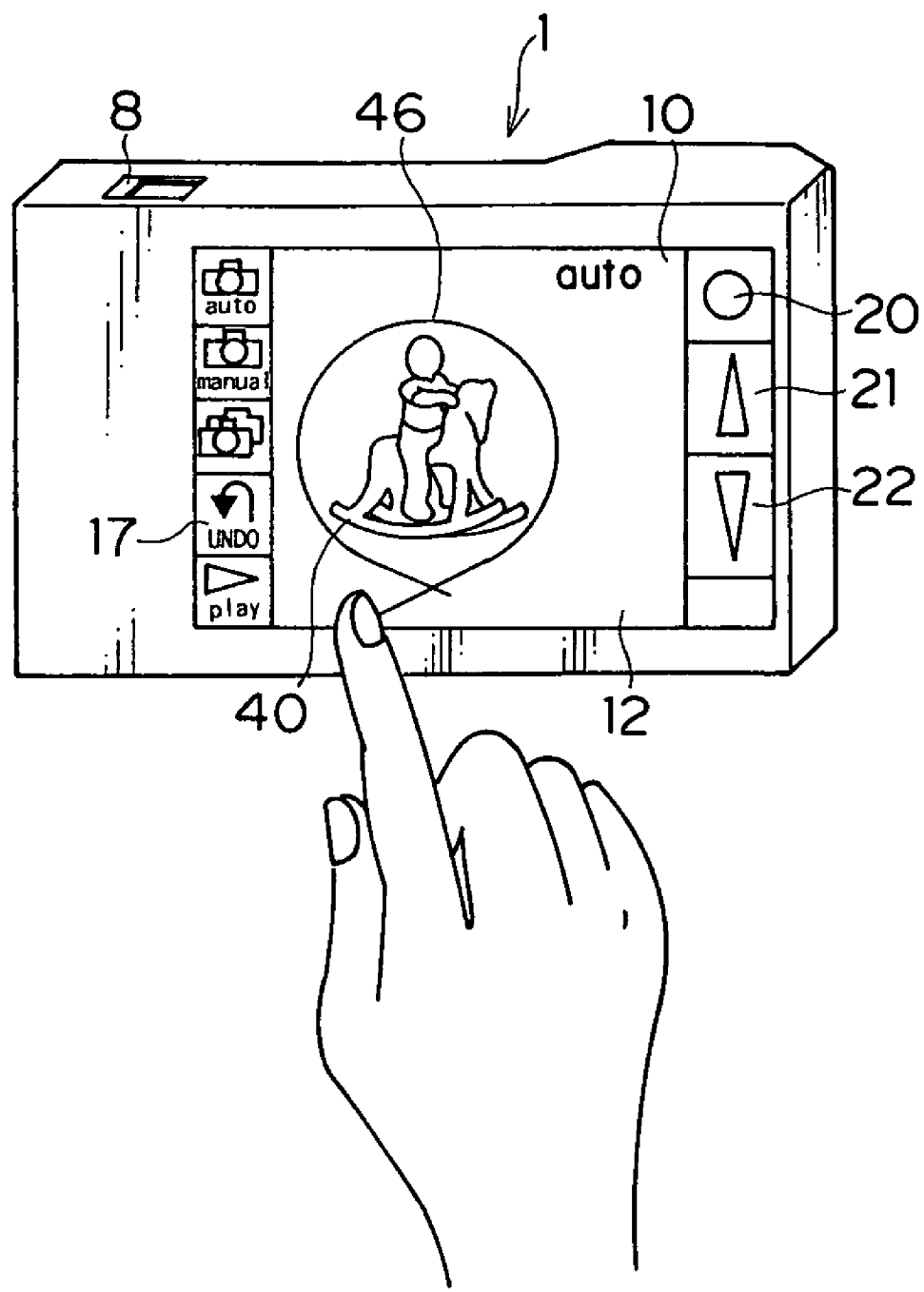
FIG. 11 is a view illustrating a state wherein the principal subject is enclosed on a screen.

FIG. 11 shows an example wherein the principal subject is enclosed by a closed figure. The cameraman encloses the desired subject as the principal subject 40 with a closed curve (a frame) 46 such as a circle in order to designate the principal subject. The track of the touched portion is determined as the curve on the screen of the display part 10 through the touch panel 12 and the CPU 38, and the curve described by the cameraman is displayed over the image shown on the display part 10. Then, when the curve is closed (when the same point is detected on the track twice), the setting of the frame 46 is completed.

To change the designation with the frame 46, the cancel button 17 is touched to cancel the previous setting of the frame 46, and the above-stated designation is repeated. When the image is designated to be stored after the setting of the principal subject, the area enclosed by the frame 46 is touched again or the release button 20 is touched to instruct to store the image.

In accordance with the storing instruction, the designated image and the positional information about the principal subject (the information about the area enclosed with the frame 46) are stored in the image memory 32.

A description will be given of the composition of the captured image and template images.

FIG. 12 shows an example in which a calendar template and the principal subject area (the stored area) are composed. At least one (preferably plural) template image is stored in the image memory 32 of the camera 1 in advance, and the template image is retrieved when a template composition button 23 is touched. If a plurality of template images are stored in the image memory 32, the up button 21 and the down button 22 are touched to change the template images to be used.

A description will be given of the procedure for composing the captured image with the template image with reference to FIG. 12.

First, the area including the principal subject is enclosed by the closed figure (the frame) 46 as described with reference to FIG. 11, so that the principal subject area is designated. Then, the image is designated to be stored, and the designated image and the positional information about the designated area are stored in the image memory 32. In accordance with the information about the designated area, a mask image for extracting the designated area from the image to be stored is created.

Then, the template composition button 23 is touched and the template image is retrieved, and the up button 21 and the down button 22 are touched as the need arises so that a desired template image is selected.

After the template image is selected, the image composition process is performed with the use of the stored image, the mask image and the template image. The composed image thereof is shown on the display part 10 and is stored in the image memory 32. As a result, the principal subject can be extracted arbitrarily from the stored image to acquire the image composed with the desired template.

In the above-described embodiment, the cameraman designates one principal subject on the screen, but it is also possible to designate a plurality of desired subjects.

Figure 13:
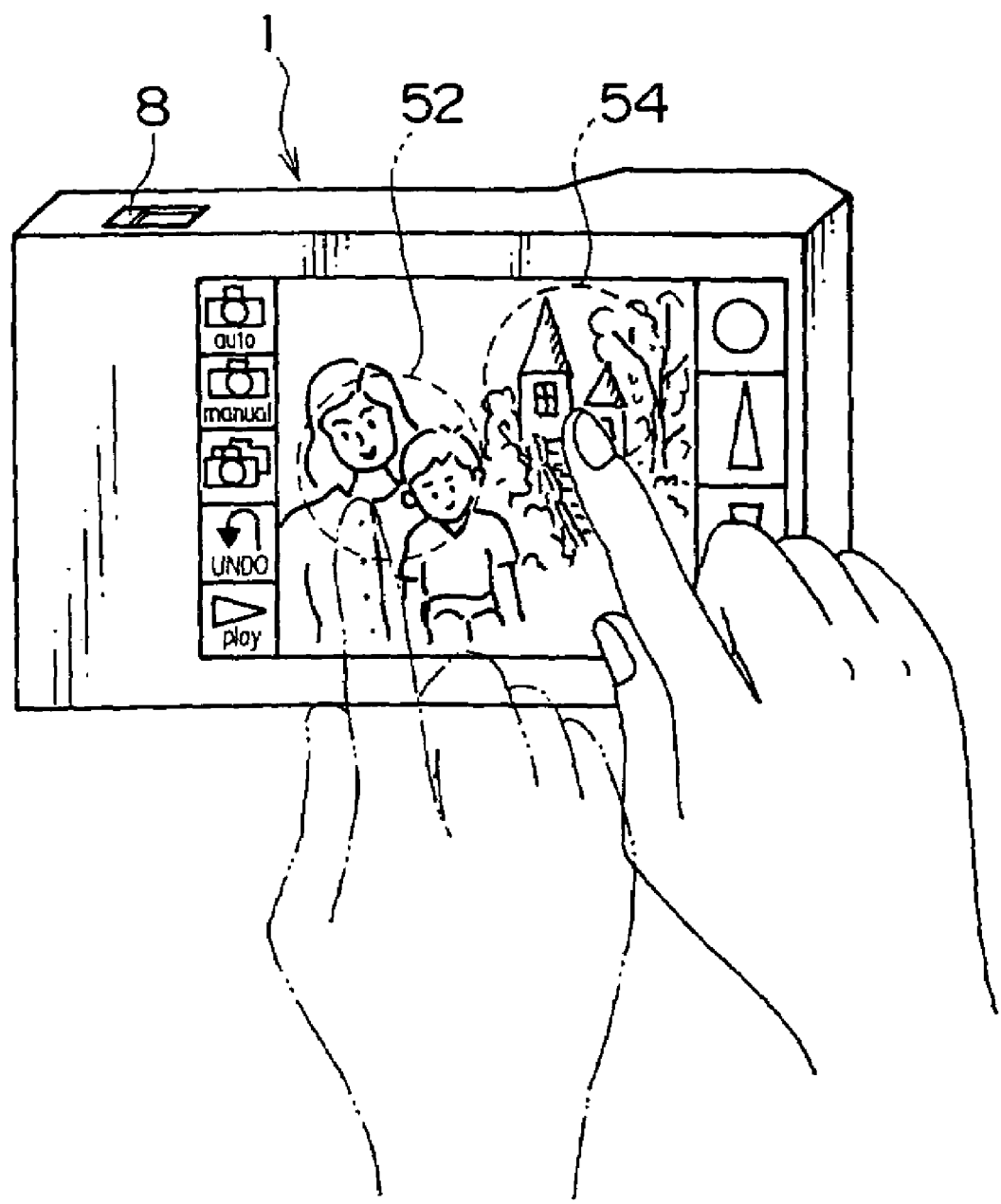
FIG. 13 is a view illustrating a state wherein a plurality of principal subjects are designated on the screen.

FIG. 13 shows an example wherein a plurality of subjects (two subjects) are designated. First, the cameraman touches the first principal subject on the screen of the display part 10, and a circle (a principal subject selection frame) 52 indicating the touched portion is displayed over the captured image, enabling the user to confirm that the principal subject is selected.

Next, the cameraman touches the second principal subject, and a circle (a principal subject selection frame) 54 indicating the touched part is displayed to let the cameraman confirm that the principal subject is selected. To change the principal subjects, the cancel button 17 at the left side of the display part 10 is touched to cancel the previous selection.

After the selection of the first and second principal subjects, the area in the principal subject selection frame 52 (or 54) is double-clicked, or the release button 20 at the upper right of the display part 10 is touched to direct that the storing be started. After the image is designated to be stored in accordance with the instruction, the camera performs a predetermined signal processing, and stores the designated image and the positional information about the first and second principal subjects in the image memory 32.

A description will be given of the AE control and the signal processing in the case where two subjects are designated.

If the cameraman designates two subjects, each principal subject is determined from the information about the touched portion of the screen in the determination methods such as (1)–(7) described with reference to FIG. 6. Photometry values are found with respect to the areas including the first and second principal subjects. Then, the mean value is found from the photometry values, and the exposure value is determined accordingly. The exposure is set in conformity with the mean value of the two photometry values.

Instead, after the photometry values are found with respect to the areas of the first and second principal subjects, the photometry values for the principal subjects are weighted and the photometry values for the other areas are lightened. Then, the photometry value of the entire screen is calculated to determine the exposure value.

In addition, after the photometry values are found with respect to the areas including the first and second principal subjects, the photometry value representing the brighter area may be adopted or the photometry value representing the brighter area may be weighted. In this case, the information remains about the photometry values of the areas including the first and second principal subjects, the information may be used after the storing.

In the case where a person is the most important subject, whether the designated two subject areas include the skin pigmentation or not is determined. If one subject area includes the skin pigmentation, the exposure may be set in conformity with the subject including the skin pigmentation. Specifically, after the two principal subjects are designated, each principal subject is determined in a certain method such as the principal subject determination methods (1)–(7) described with reference to FIG. 6. Then, whether the principal subjects include predetermined hues (hues of the skin pigmentation) or not is determined in view of the hue of the Y-color difference data. If one subject includes the area of the skin pigmentation, the exposure value is determined in conformity with the photometry value of the subject including the area of the skin pigmentation, or the photometry values for the subject including the skin pigmentation may be weighted.

After the image is designated to be stored, a knee correction is performed in an after treatment, and a number of tones are added to the subject (scene) including the skin pigmentation in the knee processing. FIG. 14 shows the knee processing which puts more emphasis on the scene including the skin pigmentation than on the background, which does not include the skin pigmentation.

In the above-stated signal processing, the exposure is set to the subject that is determined as including the skin pigmentation, and the knee processing puts emphasis on the subject including the skin pigmentation. This signal processing is advantageous if one subject including the skin pigmentation is darker than the other subject and the backlight is detected. The backlight is detected in accordance with the difference or ratio between the photometry value of the principal subject including the skin pigmentation and the photometry value of the other area.

A description will be given of a device that reproduces and outputs an image stored by the electronic camera that is constructed in the above-mentioned manner. In the following description, the image is reproduced by printing, but the image may also be reproduced on a display such as a CRT.

Figure 15:
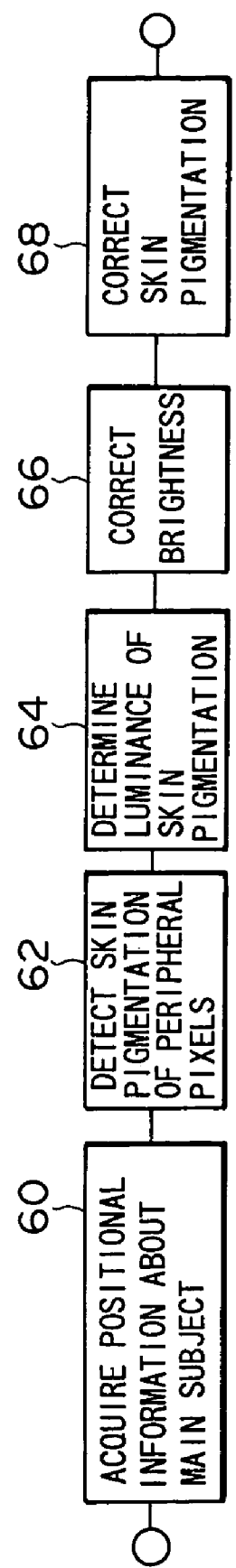
FIG. 15 is a block diagram illustrating the inner structure of a printing apparatus.

FIG. 15 is a block diagram illustrating the structure of a signal processing part in a printing apparatus. The printing apparatus may be either a special printer and a personal computer provided with a printer.

The printing apparatus has a positional information reading device 60, a skin pigmentation detecting device 62, a luminance determining device 64, a brightness correcting device 66 and a skin pigmentation correcting device 68. These devices consist of a central processing unit (CPU) and a signal processing circuit controlled by the CPU of the printing apparatus.

If the image information and the positional information about the principal subjects are stored in the built-in memory of the electronic camera 1, the electronic camera 1 is connected to the printing apparatus through a cable, and the data is transmitted from the electronic camera 1 to the printing apparatus.

If the image information and the positional information about the principal subjects are stored in the detachable external memory of the electronic camera 1, the external memory is detached from the electronic camera 1 and is inserted into a memory inlet of the printing apparatus. Thus, the printing apparatus can directly handle the data that is stored in the external memory.

Figure 16:
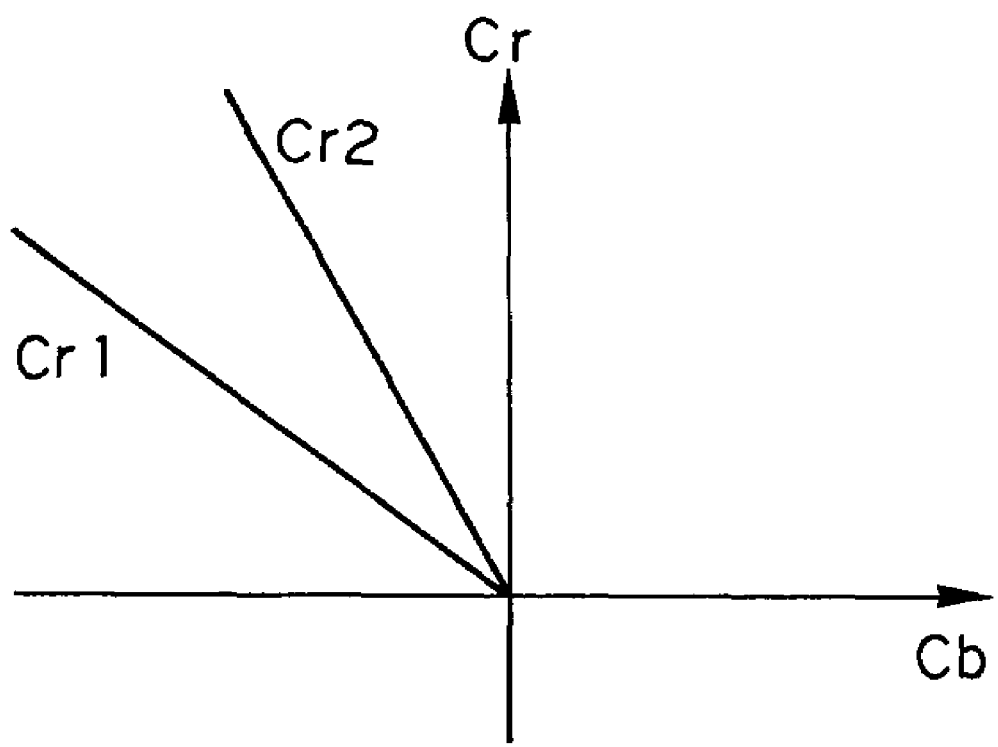
FIG. 16 is a view conceptionally describing a color difference Cb–Cr vector space, the view of assistance in explaining a method of detecting skin pigmentation.

When the image information and the positional information about the principal subject, which were stored by the electronic camera 1, are input to the printing apparatus, the positional information reading device 60 reads the positional information about the principal subject. The skin pigmentation detecting device 62 detects the skin pigmentation of pixels in proximity to the portion indicated with the positional information read by the positional information reading device 62. The skin pigmentation is detected in accordance with a relationship between the Y-color differences Cr and Cb. Specifically, in a Cb–Cr vector space in FIG. 16, boundaries represented with the following equations (1) and (2) are fixed:

$$Cr_1 = \alpha Cb \quad (1)$$

$$Cr_2 = \beta Cb \quad (2)$$

where $\alpha$ and $\rho$ are constants, and the pixels satisfying the following inequality (3) are determined as being the skin pigmentation:

$$Cr_1 < Cr < Cr_2 \quad (3).$$

Then, the luminance determining device 64 calculates the luminance within the area determined as including the skin pigmentation. The brightness correcting device 66 adjusts the gain of the entire screen so that the average luminance within the area of the skin pigmentation can be equal to a predetermined value (a target luminance), or that the average luminance within the area of the skin pigmentation can be close to the target luminance. Further, the skin pigmentation correcting device 68 makes the hues of the skin pigmentation closer to predetermined values (target hues). As a result, the image of high-quality tones can be reproduced.

The positional information read by the positional information reading device 60 is utilized for expanding and reducing a size of the image about the portion indicated with the positional information, and the positional information is also utilized for trimming and image processing.

The positional information read by the positional information reading device 60 may also be utilized for putting a mark such as an arrow on the principal subject when the image is printed or reproduced on the display. Since the reproduction apparatus is provided with such a function, a mark can be put on the subject (the principal subject) that is regarded as the most important.

Figure 17:
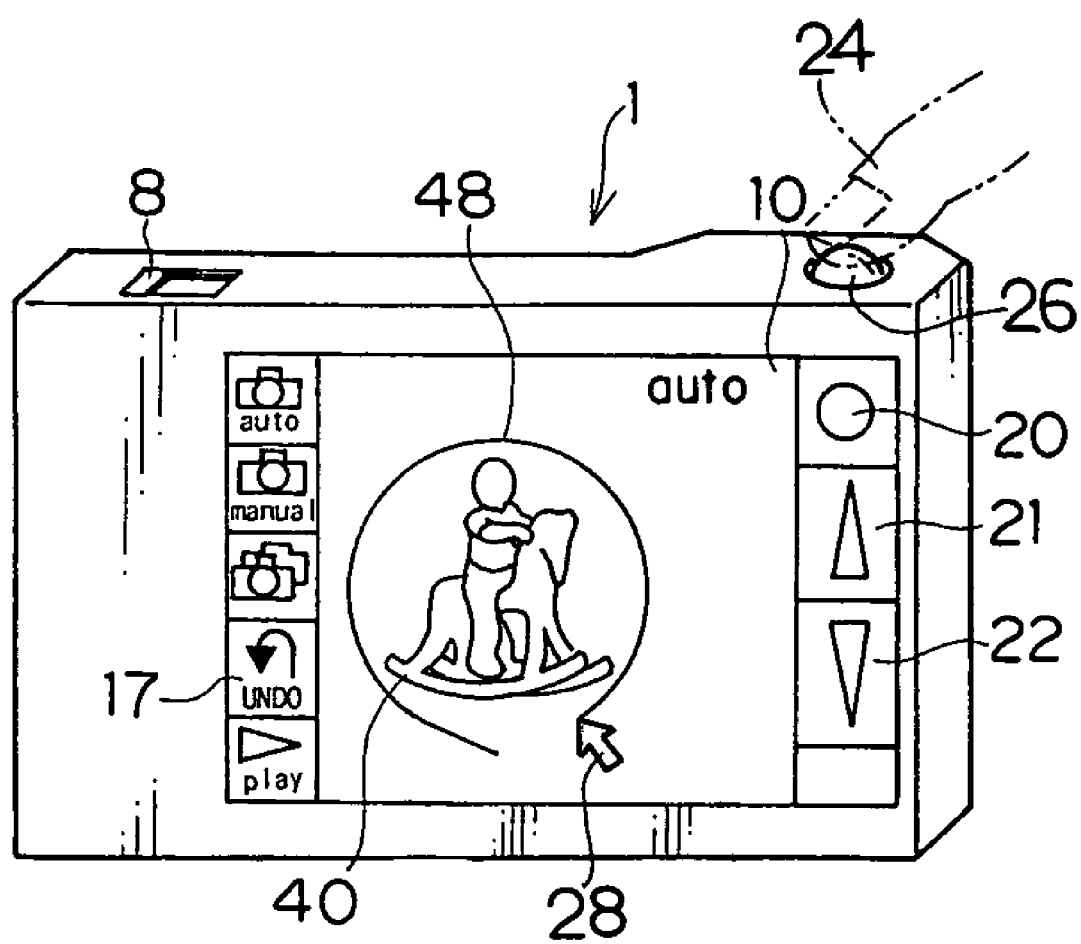
FIG. 17 is a back view of an electronic camera according to another embodiment of the present invention.

In the above-described embodiments, the electronic camera 1 is provided with the touch panel 12, but the present invention should not be restricted to this. As shown in FIG. 17, the electronic camera 1 may be provided with a pointing device or a trackball 26 on the top of the body, instead of the touch panel 12. The trackball 26 can be rotated and pushed down with the finger 24. A pointer 28 displayed on the display part 10 moves according to the rotation of the trackball 26. The pointer 28 describes a track 48 when the trackball 26 is rotated with being pushed down, whereas the pointer 28 merely moves on the screen of the display part 10 when the trackball 26 is rotated without being pushed down. The cameraman can touch a desired portion on the screen of the display part 10 with the pointer 28 by pushing down the trackball 26 in the state wherein the pointer 28 is located on the desired portion. Thus, the cameraman can control the electronic camera 1 in FIG. 17 with the trackball 26, as the cameraman controls the electronic camera 1 in FIG. 2 by touching the touch panel 12 with the finger 24.

In the above-described embodiments, the electronic camera, which electronically stores a variety of information such as the image data into the memory, is described, but the present invention may also be applied to a camera that uses a silver-halide film as a medium for recording the photographed images. For instance, an advanced photo system (APS) film is coated with a transparent magnetic recording layer, which records a variety of information other than the photographed image through a magnetic head built in the camera. For this reason, the positional information about the principal subject can be recorded as magnetic information on the magnetic recording layer at the time of photographing (strictly, when the film is transported after the photographing). Then, the film reproducing unit (a film player), the photofinishing device, etc. can use the positional information about the principal subject, which is recorded on the film, and therefore the high-quality image can be reproduced.

As set forth hereinabove, according to the camera provided with the touchscreen, merely designating the principal subject in the image shown on the screen of the display sets the focus and exposure in conformity with the principal subject. For this reason, wherever the principal subject is located on the screen, the shooting is satisfactorily performed by the simple operation. The positional information representing the position of the designated principal subject as well as the image is recorded on the recording medium, and it is therefore possible to use the positional information about the principal subject for printing or reproducing of the image. Consequently, the high-quality image is printed or reproduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is clamed is:

1. A camera for recording a captured image on a recording medium in accordance with an instruction from a recording instruction device, the camera comprising:
    an imaging part provided with an imaging optical system and an imaging device;
    an image capturing device for capturing an image of a field by the imaging part;
    a display part for showing an image captured by the imaging capturing device;
    a touch panel provided over the display part;
    a positional information acquiring device for determining a touched portion of the touch panel;
    a principal subject determining device for determining a principal subject in the captured image shown on the display part in accordance with the determined touched portion; and
    a principal subject position recorder for recording, on the recording medium, principal subject positional information representing the position of the determined principal subject in the captured image when the captured image is recorded on the recording medium in accordance with the instruction from the recording instruction device, wherein a still image is recorded on the recording medium, with the positional information of the principal subject, after the principal subject is determined.

2. The camera as defined in claim 1, further comprising an exposure controller for controlling exposure in conformity with the determined principal subject.

3. The camera as defined in claim 1, further comprising an auto-focus device for focusing the imaging optical system on the determined principal subject.

4. The camera as defined in claim 1, wherein the recording instruction device includes the touch panel and the positional information acquiring device and directs that the captured image be recorded on the recording medium when the touch panel is touched.

5. The camera as defined in claim 1, further comprising:
    a frame detector for detecting, with the positional information acquiring device, a closed figure from a track of the touched portion described on the touch panel; and
    a frame display processor for displaying the closed figure on the display part;
    wherein the principal subject determining device determines an area inside the closed figure on the captured image as the principal subject.

6. The camera as set forth in claim 1, wherein the principal subject is designated on the display part by a user at a desired position.

7. The camera as set forth in claim 1, wherein at least one of a release button and a zoom operating button is provided on the display part.

8. The camera as set forth in claim 1, wherein the touched portion of the touch panel, which is a split area including the determined touched portion, is the principal subject.

9. The camera as set forth in claim 1, wherein luminance information and hue information of the determined touched portion are determined and the determined touched portion and the split area or areas around the determined touched portion is the principal subject.

10. The camera as set forth in claim 1, wherein the determined touched portion and the split area or areas around the determined touched portion that includes substantially the same color with the determined touched portion is the principal subject when skin pigmentation is included in the determined touched portion.

11. The camera as set forth in claim 1, wherein a lower right, a lower left, an upper right, or an upper left area of the determined touched portion and the determined touched portion is the principal subject.

12. The camera as set forth in claim 1, wherein the touched portion of the touch panel and split areas within predetermined limits around the determined touched portion are the principal subject.

13. The camera as set forth in claim 1, wherein luminance information of the determined touched portion is determined and the determined touched portion and the split area or areas around the determined touched portion that has substantially the same luminance with a determined touched portion is the principal subject.

14. The camera as set forth in claim 1, wherein hue information of the determined touched portion is determined and the determined touched portion and the split area or areas around the determined touched portion that has substantially the same hue with a determined touched portion is the principal subject.

15. The camera as set forth in any one of claims 1 and 8–11, wherein after the principal subject is determined, the captured image and the positional information about the principal subject are stored.

16. The camera as set forth in claim 15, wherein when a plurality of subjects are designated on the display part, photometry values are determined with respect to areas including each principal subject, the mean value is determined from the photometry values, and an exposure value is determined.

17. The camera as set forth in claim 15, wherein when a plurality of subjects are designated on a display part, photometry values for a plurality of principal subjects are determined and weighted, while photometry values for other values are lightened, calculation is performed on the photometry value for all areas on the display part and an exposure value is determined.

18. The camera as set forth in claim 1, wherein when a plurality of subjects are designated on the display part, photometry values are determined with respect to the areas including each principal subject and the mean value is calculated from the photometry values and an exposure value is determined.

19. The camera as set forth in claim 1, wherein when a plurality of subjects are designated on the display part, photometry values for a plurality of principal subjects are determined and weighted, while photometry values for other areas are lightened, and calculation is performed on the photometry value for all areas on the display part and an exposure value is determined.

20. A printing apparatus for printing the image recorded on the recording medium by the camera of claim 1, the printing apparatus comprising:
an image tone correcting device for performing a predetermined image tone correction for the principal subject during reproduction of the recorded image in accordance with the recorded principal subject positional information.

21. The printing apparatus as defined in claim 20, further comprising:
an image processor for expanding and reducing the image about a reference point determined in accordance with the principal subject positional information.

22. A printing apparatus for printing the image recorded on the recording medium by the camera of claim 1, the printing apparatus comprising:
an image processor for expanding and reducing the image about a reference point determined in accordance with the principal subject positional information.

23. An image reproducing apparatus for reproducing, on a display, the image recorded on the recording medium by the camera of claim 1, the image reproducing apparatus comprising:
an image tone correcting device for performing a predetermined image tone correction for the principal subject during reproduction of the recorded image in accordance with the recorded principal subject positional information.

24. The image reproducing apparatus as defined in claim 23, further comprising:
an image processor for expanding and reducing the image about a reference point determined in accordance with the principal subject positional information.

25. An image reproducing apparatus for reproducing, on a display, the image recorded on the recording medium by the camera of claim 1, the image reproducing apparatus comprising:
an image processor for expanding and reducing the image about a reference point determined in accordance with the principal subject positional information.

26. An electronic camera comprising:
an imaging part provided with an imaging optical system and an imaging device;
a recording instruction device;
a recording part for recording, in a memory, an image captured by the imaging part in accordance with an instruction from the recording instruction device;
a display part for showing an image captured by the imaging part;
a touch panel provided over the display part;
a positional information acquiring device for determining a touched portion of the touch panel;
a principal subject determining device for determining a principal subject in the captured image shown on the display part in accordance with the determined touched portion; and
a principal subject position recorder for recording, on the recording memory, principal subject positional information representing the position of the determined principal subject in the captured image as well as image data representing the captured image when the captured image is recorded on the recording memory in accordance with the instruction from the recording instruction device,
wherein a still image captured by the imaging part is recorded on the recording memory, with the positional information of the principal subject, after the principal subject is determined.

27. The electronic camera as defined in claim 26, further comprising an exposure controller for controlling exposure in conformity with the determined principal subject.

28. The electronic camera as defined in claim 26, further comprising an auto-focus device for focusing the imaging optical system on the determined principal subject.

29. The electronic camera as defined in claim 26, further comprising an image tone correcting device for performing a predetermined image tone correction for the principal subject during reproduction of the recorded image in accordance with the recorded principal subject positional information.

30. The electronic camera as defined in claim 26, further comprising an image processor for expanding and reducing the captured image about a reference point determined in accordance with the principal subject positional information.

31. The electronic camera as defined in claim 26, further comprising:
a frame detector for detecting, with the positional information acquiring device, a closed figure from a track of the touched portion described on the touch panel;
a frame display processor for displaying the closed figure on the display part; and
wherein the principal subject determining device determines, as the principal subject, an area inside the closed figure on the captured image.

32. The electronic camera as defined in claim 31, further comprising:
a template image storage part for containing a template image to be composed with the captured image; and
an image composition processor for composing the template image retrieved from the template image storage part and the area inside the frame indicated with the closed figure on the captured image.

33. A camera for recording a captured image on a recording medium in accordance with an instruction from a recording instruction device, the camera comprising:
an imaging part provided with an imaging optical system and an imaging device;
a display part for showing an image captured by the imaging part;
a pointing device for controlling a pointer on the display part;
a positional information acquiring device for determining a portion of the display part pointed with the pointer;
a principal subject determining device for determining a principal subject in the captured image shown on the display part in accordance with the determined pointed portion; and
a principal subject position recorder for recording, on the recording medium, principal subject positional information representing the position of the determined principal subject in the captured image when the captured image is recorded on the recording medium in accordance with the instruction from the recording instruction device, wherein a still image is recorded on the recording medium, with the positional information of the principal subject, after the principal subject is determined.

34. A method for recording an image of a field on a recording medium, by a camera, in accordance with an instruction from a recording instruction device, comprising the steps of:

imaging a field by a imaging part at least provided with an imaging optical system and an imaging device;

showing an image on a display part obtained by imaging the field by the imaging part;

detecting a touched position in a touch panel provided in a screen of the display part;

determining a principal subject in the screen based on the detected touched position; and recording the captured image on a recording medium in accordance with an instruction from the recording instruction device, and recording principal subject information on the recording medium representing position of the determined principal subject in the captured image.

35. A camera for recording a captured image on a recording medium in accordance with an instruction from a recording instruction device, the camera comprising:

an imaging part provided with an imaging optical system and an imaging device;

an image capturing device for capturing an image of a field by the imaging part;

a display part for showing images captured during imaging of the field by the image capturing device;

a touch panel provided over the display part;

a positional information acquiring device for determining a touched portion of the touch panel;

a principal subject determining device for determining a principal subject in the captured image shown on the display part in accordance with the determined touched portion; and a principal subject position recorder for recording, on the recording medium, principal subject positional information representing the position of the determined principal subject in the captured image when the captured image is recorded on the recording medium in accordance with the instruction from the recording instruction device, wherein a still image is recorded on the recording medium, with the positional information of the principal subject, after the principal subject is determined.

36. A camera for recording a captured image on a recording medium in accordance with an instruction from a recording instruction device, the camera comprising:

an imaging part provided with an imaging optical system and an imaging device;

a signal processing part for processing signal obtained by imaging a field by the imaging part;

a display part for showing images obtained by the imaging part based on output signal from the signal processing part;

a touch panel provided over the display part;

a positional information acquiring device for determining a touched portion of the touch panel;

a principal subject determining device for determining a principal subject in the captured image shown on the display part in accordance with the determined touched portion; and a principal subject position recorder for recording, on the recording medium, principal subject positional information representing the position of the determined principal subject in the captured image when the captured image is recorded on the recording medium in accordance with the instruction from the recording instruction device, wherein a still image is recorded on the recording medium, with the positional information of the principal subject, after the principal subject is determined.

* * * * *